United States Patent
Duan et al.

(10) Patent No.: US 9,501,715 B2
(45) Date of Patent: Nov. 22, 2016

(54) METHOD FOR DETECTING SALIENT REGION OF STEREOSCOPIC IMAGE

(71) Applicant: Beijing University of Technology, Beijing (CN)

(72) Inventors: Lijuan Duan, Beijing (CN); Shuo Qiu, Beijing (CN); Wei Ma, Beijing (CN); Jun Miao, Beijing (CN); Jia Li, Beijing (CN)

(73) Assignee: Beijing University of Technology, Beijing (CN)

( * ) Notice: Subject to any disclaimer, the term of this patent is extended or adjusted under 35 U.S.C. 154(b) by 129 days.

(21) Appl. No.: 14/603,282

(22) Filed: Jan. 22, 2015

(65) Prior Publication Data
US 2016/0180188 A1 Jun. 23, 2016

(30) Foreign Application Priority Data
Dec. 19, 2014 (CN) .......................... 2014 1 0800350

(51) Int. Cl.
*G06K 9/46* (2006.01)
*G06T 5/10* (2006.01)
*G06T 7/00* (2006.01)

(52) U.S. Cl.
CPC ............. *G06K 9/4671* (2013.01); *G06T 5/10* (2013.01); *G06T 7/0075* (2013.01); *G06T 2207/10012* (2013.01)

(58) Field of Classification Search
CPC ........... G06K 9/4671; G06K 9/00711; G06K 9/4652; G06K 9/52; G06T 2207/10012; G06T 5/10; G06T 7/0075
See application file for complete search history.

(56) References Cited

U.S. PATENT DOCUMENTS

| | | | |
|---|---|---|---|
| 2010/0046837 A1* | 2/2010 | Boughorbel | G06T 7/0051 382/173 |
| 2011/0063420 A1* | 3/2011 | Masuda | G06T 7/0022 348/50 |

(Continued)

FOREIGN PATENT DOCUMENTS

CN 201310733234 A * 4/2014 ........... G06K 9/4671

*Primary Examiner* — Jingge Wu
(74) *Attorney, Agent, or Firm* — Platinum Intellectual Property LLP

(57) ABSTRACT

The present invention discloses a method for detecting a salient region of a stereoscopic image, comprising: step 1) calculating flow information of each pixel separately with respect to a left-eye view and a right-eye view of the stereoscopic image; step 2) matching the flow information, to obtain a parallax map; step 3) selecting one of the left-eye view and the right-eye view, dividing it into T non-overlapping square image blocks; step 4) calculating a parallax effect value for each of the image blocks of the parallax map; step 5) for each of the image blocks of the selected one of the left-eye view and the right-eye view, calculating a central bias feature value and a spatial dissimilarity value, and multiplying the three values, to obtain a saliency value of the image block; and step 6) obtaining a saliency gray scale map of the stereoscopic image from saliency values of the image blocks. The present invention provides a method for extracting stereoscopic saliency based on parallax effects and spatial dissimilarity, acquiring depth information by utilizing parallax, and combining visual central bias feature and spatial dissimilarity to realize more accurate detection of a stereoscopic salient region.

8 Claims, 1 Drawing Sheet

(56) References Cited

U.S. PATENT DOCUMENTS

| | | | |
|---|---|---|---|
| 2012/0224035 A1* | 9/2012 | Noguchi | H04N 13/007 348/54 |
| 2012/0249536 A1* | 10/2012 | Sutou | H04N 13/0011 345/419 |
| 2012/0308119 A1* | 12/2012 | Ogata | G06T 7/0075 382/154 |
| 2013/0100254 A1* | 4/2013 | Morioka | H04N 13/0025 348/47 |
| 2013/0101263 A1* | 4/2013 | Morioka | G03B 35/08 386/224 |
| 2013/0342641 A1* | 12/2013 | Morioka | G03B 35/08 348/36 |
| 2014/0002612 A1* | 1/2014 | Morioka | G03B 35/08 348/46 |
| 2014/0098089 A1* | 4/2014 | Sutou | H04N 13/0011 345/419 |
| 2015/0103149 A1* | 4/2015 | McNamer | G06T 7/0075 348/50 |
| 2015/0222879 A1* | 8/2015 | Hamachi | H04N 13/0022 348/47 |
| 2016/0210528 A1* | 7/2016 | Duan | G06K 9/4671 382/197 |

* cited by examiner

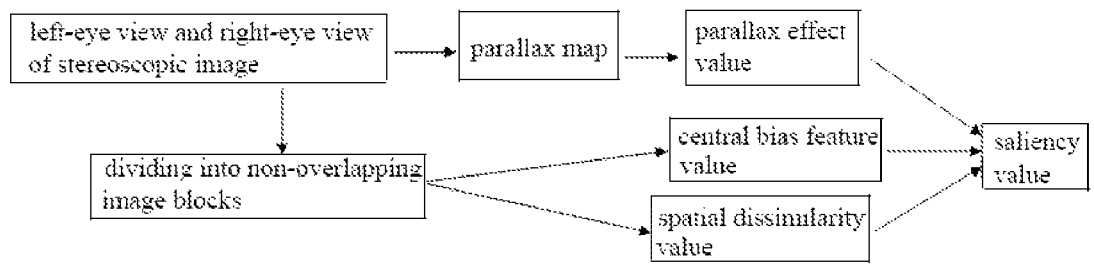

METHOD FOR DETECTING SALIENT REGION OF STEREOSCOPIC IMAGE

CROSS-REFERENCE TO RELATED APPLICATION

This application claims the priority benefit of Chinese patent application No. 201410800350.6, filed Dec. 19, 2014. The entirety of the above-mentioned patent application is hereby incorporated by reference herein and made a part of specification.

TECHNICAL FIELD

The present invention relates to a method for detecting a salient region of a stereoscopic image, and more particularly, to a method for detecting a salient region of a stereoscopic image, which is based on parallax effect and spatial dissimilarity.

BACKGROUND

As visual saliency may be utilized to simulate human visual attention mechanism, it has received a wide attention in the research field, and has become a research subject in neuroscience, robotics, computer vision and other fields. Identification of salient regions may be applied to object recognition, image relocation, visual tracking and image segmentation, and also may be applied to analysis on selection of human fixation. Currently, methods for extracting saliency are generally oriented to a single two-dimensional image. With the development of information science and technology, an increasing number of stereoscopic images abound in ordinary lives, which poses a challenge to the technology of extraction of saliency. Based on researches of saliency of two-dimensional images, saliency of a stereoscopic image should be analyzed and sampled in a different way, new factors and features should be considered, and stereoscopic saliency should be estimated comprehensively.

In 2012, C. Lang provided a theoretical basis and a method for extracting a depth feature. Firstly, four conclusions are derived from a large number of experiments on fixation tracking of 2D images and 3D images: (1) a depth feature tends to modulate visual saliency to a farther range of depth, however, human visual systems are still more likely to focus on scenes with relatively small depths; (2) a large number of fixations are landed on a small number of objects of interest, and this characteristic applies to both 2D and 3D images; (3) nonlinear changes presents between depth features and saliencies; (4) with depth information accumulates, changes of distribution of fixations between 2D and 3D will increase, especially for images which has salient stimuli in different ranges of depth. The four conclusions provide important theoretical bases for applying extraction of depth features on detection of salient objects, and demonstrate that existence of depth features will significantly affect the size and distribution of visual saliency in an image. In the literature, after the four conclusions have been reached, depth features are extracted by fitting a Gaussian probability density function of the depth of decomposition, and a saliency algorithm for stereoscopic images is obtained by combining a 2D saliency algorithm. In 2013, K. Desingh further optimized and expanded C. Lang's study, and obtained a three-dimensional algorithm by adding to experiments a test of blurred images in backgrounds with high depths and central bias, extracting depth features by utilizing a global contrast-based idea of M. M. Cheng and point cloud segmentation technology, and combining a two-dimensional saliency algorithm. In 2012, Niu proposed two methods, of which one is an estimation and comparison method based on global parallax (CSS), and the other is a method based on stereoscopic rules. He combined the two methods in his literature to extract saliency of stereoscopic images. However, their accuracies in detecting salient regions are all not high enough.

SUMMARY

One object of the present invention is to overcome the defect that accuracy in detecting salient regions is not high enough, and to provide at least advantages given below.

Another object of the present invention is to provide a method for detecting a salient region of a stereoscopic image, which is based on parallax effect and spatial dissimilarity. Through the method for detecting a salient region of a stereoscopic image provided by the present invention, accuracies in detecting salient regions may be significantly enhanced.

In order to achieve these objects and other advantages according to the present invention, a method for detecting a salient region of a stereoscopic image, which is based on parallax effect and spatial dissimilarity, comprising the following steps:

step 1) calculating flow information of each pixel by utilizing Sift Flow algorithm separately with respect to a left-eye view and a right-eye view of the stereoscopic image;

step 2) matching the flow information of the left-eye view and the right-eye view, to obtain position displacements between corresponding pixel points in the two views as parallax values, thereby to obtain a parallax map;

step 3) selecting one of the left-eye view and the right-eye view, dividing it into T non-overlapping square image blocks, each of the image blocks containing K2 pixels;

step 4) dividing the parallax map into image blocks corresponding to the image blocks divided in the step 3), calculating a parallax effect value for each of the image blocks of the parallax map;

step 5) for each of the image blocks of the selected one of the left-eye view and the right-eye view, calculating a central bias feature value and a spatial dissimilarity value, and multiplying three values of the central bias feature value, the spatial dissimilarity value and the parallax effect value in the step 4), to obtain a saliency value of the image block; and step 6) replacing a saliency value of each pixel of each of the image blocks with the saliency value of the image block, normalizing saliency values of all of the pixels, to obtain a saliency gray scale map of the stereoscopic image.

Preferably, in the method for detecting a salient region of a stereoscopic image, obtaining a parallax map comprises: presenting each of the parallax values as a gray scale value on the image, wherein, the gray scale value is in a range of [0~255], and the parallax value positively correlates to the gray scale value.

Preferably, in the method for detecting a salient region of a stereoscopic image, wherein, the method further comprises the following step:

step 7) filtering the saliency gray scale map twice, to obtain a salient region of the stereoscopic image.

Preferably, in the method for detecting a salient region of a stereoscopic image, wherein, in the step 4), calculating a parallax effect value comprises:

① a formula for calculating a parallax effect value is:

$$S_d(p_i) = \sum_{p_k \neq p_i}^{T} D_r(p_i, p_k)$$

$S_d$ represents a parallax effect value of an image block $p_i$, wherein, each of the image blocks is denoted as $p_n$, n=1, 2, 3, ... T, (i, k) n; wherein, ② $D_r(p_i, p_k)$ represents a region distance between two different regions $p_i$ and $p_k$, and a region distance between a first image block and a second image block is defined as:

$$D_r(p_1, p_2) = \sum_{i=1}^{n_1} \sum_{j=1}^{n_2} f(c_{1,i}) f(c_{2,j}) D(p_1, p_2)$$

f(x) represents a function for calculating a probability density of a gray scale, $c_{n,h}$ represents a gray scale value of a $h^{th}$ pixel of an image block $p_n$, (i,j) h, $n_1$, $n_2$ respectively represents numbers of pixel points in image blocks $p_1$ and $p_2$;

region distances between the other image blocks are calculated with the same algorithm, wherein, ③ $D(p_1, p_2)$ represents a relative vector distance, and a relative vector distance between a first image block and a second image block is defined as:

$$D(p_1, p_2) = \sum_{i=1}^{n} (x_{1,i} - x_{2,i})$$

$x_{k,i}$ denotes a gray scale value of an $i^{th}$ pixel in an image block $p_k$ in the parallax map, n is a number of pixels in a block;

relative vector distances between the other image blocks are calculated with the same algorithm.

Preferably, in the method for detecting a salient region of a stereoscopic image, wherein, in the step 5), calculating a central bias feature value as:

$\omega_1(p_1) = 1 - DTC(p_1)/D_{max}$ $\omega_1(x)$ represents a function for calculating a central bias feature value, $p_1$ represents a first image block, DTC represents an Euclidean distance of a first image block $p_1$ to a center of the selected one of the left-eye view and the right-eye view, and $D_{max}$ represents a maximum distance of any pixel in the image to the center of the image;

central bias feature values of the other image blocks in the image block are calculated with the same algorithm.

Preferably, in the method for detecting a salient region of a stereoscopic image, wherein, in the step 5), calculating a spatial dissimilarity value comprises:

combining a three-channel pixel value of each of the image blocks as a column vector f, to form a pixel matrix $X = [f_1, f_2, f_3, \ldots, f_T]^T$, subtracting an average of a column of pixels from each pixel value of the column of pixels, and constituting a covariance matrix $G = X^T X / T^2$ as a T*T matrix G, calculating eigenvalues and eigenvectors of G, keeping d largest eigenvectors, d taking a value of 0.6*T, wherein so far the image block is represented as $U = [X_1, X_2, \ldots, X_d]^T$ in a decreased-dimension space, $X_i$ is an eigenvector, U is a d*L matrix, and a spatial dissimilarity value between blocks $p_1$ and $p_k$ is calculated as:

$$\text{dissimilarity}(p_1, p_k) = \sum_{s=1}^{d} |x_{s1} - x_{sk}|$$

Preferably, in the method for detecting a salient region of a stereoscopic image, wherein, in the step 5), multiplying the three values as:

$$Sal(p_i) = \omega_1(p_i) S_d(p_i) \sum_{p_i \neq p_k}^{T} \text{dissimilarity}(p_i, p_k)$$

wherein, $Sal(P_i)$ represents a saliency value of an image block $P_i$.

Preferably, in the method for detecting a salient region of a stereoscopic image, wherein in the step 7), removing image blocks which have negative parallax effect values, taking top 5% pixel points with largest salient values as candidate salient regions, performing an over segmentation on the original image, converging the candidate salient regions toward original image blocks resulted from the over segmentation with a converging rule: if each of the pixels on a block resulted from the over segmentation of the original image is a salient pixel point in a salient region, keeping the block, otherwise deleting the block.

The present invention has at least advantageous effects as follows:

1. in the present invention, depth information is acquired by utilizing parallax, and stereoscopic saliencies are extracted by adding weights based on visual effects, and a new idea of extraction of saliencies orienting to a stereoscopic image in a form of a left-eye view and a right-eye view is provided;

2. in the present invention, extraction of saliencies and detection of salient regions are achieved more accurately by combining three features of parallax effect, central bias and spatial dissimilarity.

Additional advantages, objects and features of the present invention will be partly embodied by the following description, and partly understood by those skilled in the art through study and practice of the present invention.

BRIEF DESCRIPTION OF THE DRAWINGS

FIG. 1 is a flow chart showing a method for detecting a salient region of a stereoscopic image according to an embodiment of the present invention.

DETAILED DESCRIPTION

Hereinafter, the present invention is further described in detail in conjunction with accompany drawings, to enable those skilled in the art to practice the invention with reference to the contents of the description.

A stereoscopic image database as input involved in the present invention is derived from a database established by Niu in 2012. The source database has about 1000 pairs of stereoscopic images in forms of left-eye views and right-eye views. However, it is found out that a rule that an image is thought as available by Niu is that: if an objective is identified by three persons, and all of them identify the image unanimously, the image will be thought as available, and the identified objective is taken as Ground Truth. However, we think that only 3 persons identifying an objective is not enough for an experiment, and the sample size is too small, which will cause randomness. Therefore, in the present invention, 1000 pairs of stereoscopic images are screened again, to keep those images with single objective in the foreground and remove images with multiple objectives from the database, in order to make identification of salient objectives more accurately. Finally, we removed 300 pairs of images and kept 700 pairs to form a dataset which is still sufficiently large.

FIG. 1 shows the steps of the method for detecting a salient region of a stereoscopic image, including the following steps.

In step 1), flow information of each pixel is calculated by utilizing Sift Flow algorithm separately with respect to a left-eye view and a right-eye view of the stereoscopic image.

In step 2), the flow information of the left-eye view and the right-eye view is matched, to obtain position displacements between corresponding pixel points in the two views as parallax values, thereby to obtain a parallax map. The depth information may be extracted by using a depth extracting device to photograph depth of a scene. Since according to principles of generation of human parallax, a size of parallax has an inverse relationship with a size of depth, and the greater a gray scale value on the parallax map is, the greater the parallax is. Therefore, depth information may be extracted by extracting parallax information from input of only one stereoscopic image based on a left-eye view and a right-eye view.

In step 3), one of the left-eye view and the right-eye view is selected and divided into T non-overlapping square image blocks, each of the image blocks containing $K^2$ pixels. For example, a M*N left-eye view is selected and divided into T non-overlapping square image blocks, each of the image blocks containing K pixels in a lateral direction, and K pixels in a longitudinal direction, $T=M*N/K^2$, and each of the blocks being denoted as $p_i$, i=1, 2, 3, . . . T. Wherein the values of M, N, K are set by the user.

In step 4), the parallax map is divided into image blocks corresponding to the image blocks divided in the step 3), and a parallax effect value for each of the image blocks of the parallax map is calculated.

In step 5), for each of the image blocks of the selected one of the left-eye view and the right-eye view, a central bias feature value and a spatial dissimilarity value are calculated, and three values of the central bias feature value, the spatial dissimilarity value and the parallax effect value in the step 4) are multiplied, to obtain a saliency value of the image block. Central bias may be interpreted physically as neurons which fixed on the center being more susceptible to excitation, which may be utilized to better simulate the human visual characteristics, and therefore the factor of central bias is introduced into the method.

In step 6), a saliency value of each pixel of each of the image blocks is replaced with the saliency value of the image block, and saliency values of all of the pixels are normalized, to obtain a saliency gray scale map of the stereoscopic image.

In another example, obtaining a parallax map is: presenting each of the parallax values as a gray scale value on the image, wherein, the gray scale value is in a range of [0~255], and the parallax value positively correlates to the gray scale value. Since a size of parallax has an inverse relationship with a size of depth, and the greater a gray scale value on the parallax map is, the greater the parallax is. Therefore, depth information may be extracted by extracting parallax information from input of only one stereoscopic image based on a left-eye view and a right-eye view. Also, this method is only an illustration of a preferred embodiment, and the present invention is not limited thereto.

An implementation of the above method for detecting a salient region of a stereoscopic image based on parallax effect and spatial dissimilarity, further comprises the following step:

in step 7), the saliency gray scale map is filtered twice, to obtain a salient region of the stereoscopic image.

An implementation of the above method for detecting a salient region of a stereoscopic image based on parallax effect and spatial dissimilarity is, in the step 4), calculating a parallax effect value comprises:

① a formula for calculating a parallax effect value is:

$$S_d(p_i) \sum_{p_k \neq p_i}^{T} D_r(p_i, p_k)$$

$S_d$ represents a parallax effect value of an image block $p_i$, wherein, each of the image blocks is denoted as $p_n$, n=1, 2, 3, . . . T, (i,k) n; wherein, ② $D_r(p_i,p_k)$ represents a region distance between two different regions $p_i$ and $p_k$, and a region distance between a first image block and a second image block is defined as:

$$D_r(p_1, p_2) = \sum_{i=1}^{n_1} \sum_{j=1}^{n_2} f(c_{1,i}) f(c_{2,j}) D(p_1, p_2)$$

f(x) represents a function for calculating a probability density of a gray scale, $c_{n,h}$ represents a gray scale value of a $h^{th}$ pixel of an image block $p_n$, (i, j) h, $n_1$, $n_2$ respectively represents numbers of pixel points in image blocks $p_1$ and $p_2$. Here, we believe, a higher pixel gray scale frequency and a greater relative vector gray scale distance a block has, a greater saliency it has.

Region distances between the other image blocks are calculated with the same algorithm, wherein, ③ $D(p_1, p_2)$ represents a relative vector distance, and a relative vector distance between a first image block and a second image block is defined as:

$$D(p_1, p_2) = \sum_{i=1}^{n} (x_{1,i} - x_{2,i})$$

$x_{k,I}$ denotes a gray scale value of an $i^{th}$ pixel in an image block $p_k$ in the parallax map, n is a number of pixels in a block;

relative vector distances between the other image blocks are calculated with the same algorithm. Here, the calculation of relative vector distances does not include calculation of absolute values, since a pixel which has a negative distance is probably a background region. By this way, parallax effects of blocks corresponding to these pixels may be balanced very well, to extract information on foreground objectives more accurately.

An implementation of the above method for detecting a salient region of a stereoscopic image based on parallax effect and spatial dissimilarity is, in the step 5), calculating a central bias feature value as:

$$\omega_1(p_1)=1-DTC(P_1)/D_{max}$$

$\omega_1(x)$ represents a function for calculating a central bias feature value, $p_1$ represents a first image block, DTC represents an Euclidean distance of a first image block $p_1$ to a center of the selected one of the left-eye view and the right-eye view, and $D_{max}$ represents a maximum distance of any pixel in the image to the center of the image;

central bias feature values of the other image blocks in the image block are calculated with the same algorithm.

An implementation of the above method for detecting a salient region of a stereoscopic image based on parallax effect and spatial dissimilarity is, in the step 5), calculating a spatial dissimilarity value comprises:

Dissimilarity between blocks is calculated through a quasi PCA method for decreasing dimensions. Specifically, the process is: combining a three-channel pixel value of each of the image blocks as a column vector f, to form a pixel matrix $X=[f_1, f_2, f_3, \ldots, f_T]^T$, subtracting an average of a column of pixels from each pixel value of the column of pixels, and constituting a covariance matrix $G=X^TX/T^2$ as a T*T matrix G, calculating eigenvalues and eigenvectors of G, keeping d largest eigenvectors, d taking a value of 0.6*T, wherein so far the image block is represented as $U=[X_1, X_2, \ldots, X_d]^T$ in a decreased-dimension space, $X_i$ is an eigenvector, U is a d*L matrix, and a spatial dissimilarity value between blocks $p_1$ and $p_k$ is calculated as:

$$\text{dissimilarity}(p_1, p_k) = \sum_{s=1}^{d} |x_{s1} - x_{sk}|$$

In another example, in the step 5), multiplying the three values as:

$$Sal(p_i) = \omega_1(p_i)S_d(p_i) \sum_{p_i \neq p_k}^{T} \text{dissimilarity}(p_i, p_k)$$

wherein, $Sal(P_i)$ represents a saliency value of an image block $P_i$. Saliencies of the other image blocks are calculated with the same algorithm. According to the above algorithm, saliencies of T non-overlapping image blocks resulted from division of one of the left-eye view and the right-eye view are calculated.

An implementation of the above method for detecting a salient region of a stereoscopic image based on parallax effect and spatial dissimilarity is, in the step 7), removing image blocks which have negative parallax effect values, taking top 5% pixel points with largest salient values as candidate salient regions, performing an over segmentation on the original image, converging the candidate salient regions toward original image blocks resulted from the over segmentation with a converging rule: if each of the pixels on a block resulted from the over segmentation of the original image is a salient pixel point in a salient region, keeping the block, otherwise deleting the block. Factors in a background may take a negative value due to the calculation of a parallax effect value, which will be deleted, so as not to affect display of the saliency map and subsequent calculation. A final salient region is obtained through two times of filtration.

As described above, according to the present invention, since a saliency value is estimated by combining features such as parallax effect, central bias and spatial dissimilarity, accuracy in detecting a salient region is significantly enhanced.

Comparison between the method for detecting a salient region of a stereoscopic image of the present invention and other methods is shown in Table 1, in which F-measure value comparison is made respectively against HC algorithm and RC algorithm proposed by M. M. Cheng in 2012, H algorithm proposed by X. Hou in 2007, W algorithm proposed by C. Wu in 2011, G algorithm proposed by S. Goferman in 2010 and M algorithm proposed by Margolin in 2013. As shown in the results, F-measure values of the present invention are larger than F-measure values of the other methods, which demonstrates that accuracy of the method of the present invention is higher than any of that of the other methods.

TABLE 1

| F-measure value comparison between the method for detecting a stereoscopic salient region and other methods | | | | | | |
|---|---|---|---|---|---|---|
| Methods | Our | Hou | Gofeman | Wu | Margolin | Cheng-HC | Cheng-RC |
| F-measure | 0.5144 | 0.3648 | 0.3947 | 0.4541 | 0.4360 | 0.3768 | 0.4401 |

Although the embodiments of the present invention have been disclosed as above, they are not limited merely to those set forth in the description and the embodiments, and they may be applied to various fields suitable for the present invention. For those skilled in the art, other modifications may be easily achieved, and the present invention is not limited to the particular details and illustrations shown and described herein, without departing from the general concept defined by the claims and their equivalents.

What is claimed is:

1. A method for detecting a salient region of a stereoscopic image, which is based on parallax effect and spatial dissimilarity, comprising the following steps:
    step 1) calculating flow information of each pixel by utilizing Sift Flow algorithm separately with respect to a left-eye view and a right-eye view of the stereoscopic image;
    step 2) matching the flow information of the left-eye view and the right-eye view, to obtain position displacements between corresponding pixel points in the two views as parallax values, thereby to obtain a parallax map;
    step 3) selecting one of the left-eye view and the right-eye view, dividing it into T non-overlapping square image blocks, each of the image blocks containing $K^2$ pixels;
    step 4) dividing the parallax map into image blocks corresponding to the image blocks divided in the step 3), calculating a parallax effect value for each of the image blocks of the parallax map;
    step 5) for each of the image blocks of the selected one of the left-eye view and the right-eye view, calculating a central bias feature value and a spatial dissimilarity value, and multiplying three values of the central bias feature value, the spatial dissimilarity value and the parallax effect value in the step 4), to obtain a saliency value of the image block; and step 6) replacing a saliency value of each pixel of each of the image blocks with the saliency value of the image block, normalizing saliency values of all of the pixels, to obtain a saliency gray scale map of the stereoscopic image.

2. The method for detecting a salient region of a stereoscopic image of claim 1, characterized in that, obtaining a parallax map comprises: presenting each of the parallax values as a gray scale value on the image, wherein, the gray scale value is in a range of [0~255], and the parallax value positively correlates to the gray scale value.

3. The method for detecting a salient region of a stereoscopic image of claim 2, wherein, the method further comprises the following step:

step 7) filtering the saliency gray scale map twice, to obtain a salient region of the stereoscopic image.

4. The method for detecting a salient region of a stereoscopic image of claim 2, wherein, in the step 4), calculating a parallax effect value comprises:

① a formula for calculating a parallax effect value is:

$$S_d(p_i) \sum_{p_k \neq p_i}^{T} D_r(p_i, p_k)$$

$S_d$ represents a parallax effect value of an image block $p_i$, wherein, each of the image blocks is denoted as $p_n$, n=1, 2, 3, . . . T, (i, k) n; wherein, ② $D_r(p_i, p_k)$ represents a region distance between two different regions $p_i$ and $p_k$, and a region distance between a first image block and a second image block is defined as:

$$D_r(p_1, p_2) = \sum_{i=1}^{n_1} \sum_{j=1}^{n_2} f(c_{1,i}) f(c_{2,j}) D(p_1, p_2)$$

f(x) represents a function for calculating a probability density of a gray scale, $c_{n,h}$ represents a gray scale value of a $h^{th}$ pixel of an image block $p_n$, (i,j) h, $n_1$, $n_2$ respectively represents numbers of pixel points in image blocks $p_1$ and $p_2$;

region distances between the other image blocks are calculated with the same algorithm, wherein, ③ $D(p_1, p_2)$ represents a relative vector distance, and a relative vector distance between a first image block and a second image block is defined as:

$$D(p_1, p_2) = \sum_{i=1}^{n} (x_{1,i} - x_{2,i})$$

$x_{k,i}$ denotes a gray scale value of an $i^{th}$ pixel in an image block $p_k$ in the parallax map, n is a number of pixels in a block;

relative vector distances between the other image blocks are calculated with the same algorithm.

5. The method for detecting a salient region of a stereoscopic image of claim 4, wherein, in the step 5), calculating a central bias feature value as:

$$\omega_1(p_1)=1-DTC(p_1)/D_{max}$$

$\omega_1(x)$ represents a function for calculating a central bias feature value, $p_1$ represents a first image block, DTC represents an Euclidean distance of a first image block $p_1$ to a center of the selected one of the left-eye view and the right-eye view, and $D_{max}$ represents a maximum distance of any pixel in the image to the center of the image;

central bias feature values of the other image blocks in the image block are calculated with the same algorithm.

6. The method for detecting a salient region of a stereoscopic image of claim 5, wherein, in the step 5), calculating a spatial dissimilarity value comprises:

combining a three-channel pixel value of each of the image blocks as a column vector f, to form a pixel matrix $X=[f_1, f_2, f_3, \ldots, f_T]^T$, subtracting an average of a column of pixels from each pixel value of the column of pixels, and constituting a covariance matrix $G=X^TX/T^2$ as a T*T matrix G, calculating eigenvalues and eigenvectors of G, keeping d largest eigenvectors, d taking a value of 0.6*T, wherein so far the image block is represented as $U=[X_1, X_2, \ldots, X_d]^T$ in a decreased-dimension space, $X_i$ is an eigenvector, U is a d*L matrix, and a spatial dissimilarity value between blocks $p_1$ and $p_k$ is calculated as:

$$\text{dissimilarity}(p_1, p_k) = \sum_{s=1}^{d} |x_{s1} - x_{sk}|$$

7. The method for detecting a salient region of a stereoscopic image of claim 6, wherein, in the step 5), multiplying the three values as:

$$Sal(p_i) = \omega_1(p_i) S_d(p_i) \sum_{p_i \neq p_k}^{T} \text{dissimilarity}(p_i, p_k)$$

wherein, Sal($P_i$) represents a saliency value of an image block $P_i$.

8. The method for detecting a salient region of a stereoscopic image of claim 7, wherein in the step 7), removing image blocks which have negative parallax effect values, taking top 5% pixel points with largest salient values as candidate salient regions, performing an over segmentation on the original image, converging the candidate salient regions toward original image blocks resulted from the over segmentation with a converging rule: if each of the pixels on a block resulted from the over segmentation of the original image is a salient pixel point in a salient region, keeping the block, otherwise deleting the block.

* * * * *